United States Patent
Plumlee et al.

(10) Patent No.: US 12,259,042 B2
(45) Date of Patent: Mar. 25, 2025

(54) ELASTOMERIC SEALING DEVICE

(71) Applicant: Centex Industrial Gasket, LLC, Leander, TX (US)

(72) Inventors: Landon Plumlee, Leander, TX (US); Clinton Plumlee, Leander, TX (US); Rosemary Cohoon, Leander, TX (US)

(73) Assignee: Centex Industrial Gaskey, LLC, Leander, TX (US)

( * ) Notice: Subject to any disclaimer, the term of this patent is extended or adjusted under 35 U.S.C. 154(b) by 0 days.

(21) Appl. No.: 18/592,265

(22) Filed: Feb. 29, 2024

(65) Prior Publication Data
US 2024/0295266 A1 Sep. 5, 2024

Related U.S. Application Data

(60) Provisional application No. 63/487,862, filed on Mar. 1, 2023.

(51) Int. Cl.
| F16J 15/02 | (2006.01) |
| B29C 45/14 | (2006.01) |
| B29L 31/26 | (2006.01) |

(52) U.S. Cl.
CPC ....... *F16J 15/022* (2013.01); *B29C 45/14008* (2013.01); *B29L 2031/265* (2013.01)

(58) Field of Classification Search
CPC .......... B29C 45/14008; B29L 2031/265; F16J 15/022
See application file for complete search history.

(56) References Cited

U.S. PATENT DOCUMENTS

| | | | | |
|---|---|---|---|---|
| 3,191,950 A | * | 6/1965 | Hiltner | F16J 15/122 |
| | | | | 264/273 |
| 4,535,996 A | * | 8/1985 | Cardis | F16J 15/127 |
| | | | | 277/596 |
| 4,572,522 A | * | 2/1986 | Smagatz | F16J 15/121 |
| | | | | 277/632 |
| 5,137,674 A | * | 8/1992 | Braconier | B29D 99/0053 |
| | | | | 264/161 |
| 5,618,047 A | * | 4/1997 | Belter | F16J 15/067 |
| | | | | 277/650 |
| 6,173,966 B1 | * | 1/2001 | Noble | F16J 15/121 |
| | | | | 277/596 |
| 6,543,787 B1 | * | 4/2003 | Inciong | F16J 15/127 |
| | | | | 277/649 |
| 6,883,483 B1 | | 4/2005 | Knudsen et al. | |
| 7,059,612 B2 | * | 6/2006 | Kuribayashi | F16B 43/001 |
| | | | | 277/637 |
| 8,439,366 B2 | * | 5/2013 | Raillard | F16J 15/064 |
| | | | | 277/924 |
| 10,557,389 B2 | | 2/2020 | Boi et al. | |
| 10,753,521 B1 | | 8/2020 | Daigle et al. | |
| 2005/0248101 A1 | * | 11/2005 | Oka | F16J 15/22 |
| | | | | 277/650 |
| 2006/0012077 A1 | * | 1/2006 | Salameh | F16J 15/108 |
| | | | | 264/161 |

(Continued)

*Primary Examiner* — Eugene G Byrd
(74) *Attorney, Agent, or Firm* — Michael O Sheinberg; Scheinberg & Associates, PC

(57) ABSTRACT

Described is seal that can replace an O-ring seal in an existing machine. The seal could also be used in place of an O-ring in a new machine. The seal includes a top and bottom surface and a bead that extends from the top surface for seating into the O-ring-seating groove.

14 Claims, 5 Drawing Sheets

(56) References Cited

U.S. PATENT DOCUMENTS

| | | |
|---|---|---|
| 2006/0055123 A1 | 3/2006 | Angot et al. |
| 2010/0109258 A1 | 5/2010 | Smith |
| 2010/0253012 A1 | 10/2010 | Zhuang et al. |
| 2013/0049308 A1* | 2/2013 | Raillard ............... F16J 15/064 |
| | | 277/648 |
| 2014/0151916 A1* | 6/2014 | Larson ............... F01M 11/0004 |
| | | 264/40.1 |
| 2019/0360589 A1* | 11/2019 | Watanabe ............ F16J 15/106 |
| 2021/0131559 A1 | 5/2021 | Gross et al. |
| 2022/0085433 A1* | 3/2022 | Daughrity ........... H01M 10/613 |
| 2022/0316597 A1* | 10/2022 | Hsiao .................. F16J 15/108 |
| 2023/0339197 A1* | 10/2023 | Studnicka ............. B29C 73/24 |
| 2023/0349466 A1 | 11/2023 | Larson et al. |

* cited by examiner

ELASTOMERIC SEALING DEVICE

TECHNICAL FIELD

The present disclosure relates to a device and method for sealing the connection between two components that are stationary relative to each other.

BACKGROUND

Mechanical components sometimes need to be fixed relative to each using a seal between them that prevents material, such as lubricants, from leaking through the seal and that prevents contamination from entering the components through the seal. For example, mechanical housings often have covers that need to be sealed to the housing to prevent lubrication in the housing from leaking out and to prevent debris and other elements from entering into the housing. In some applications, the housing and the cover have flat surfaces that face each other. The flat surfaces are typically forced together with a flat sealing gasket between them. The gasket typically has holes within the gasket material for passing fasteners, such as bolts or machine screws, to secure the components together with the gasket between.

In some applications, O-rings are used to form a seal between two mechanical components instead of a flat gasket. The O-ring is positioned in a groove on one of the mechanical components. The groove in which the O-ring is seated often follows an irregular path, typically near the outside edge of one of the faces of the two components being connected. The grove may deviate around fastener holes. The cross-sectional diameter of the O-ring is typically smaller than width of the groove and larger than the depth of the groove so that the O-ring is compressed and flattened to some degree when the two components are tightened together by the force of the fasteners.

The O-ring itself is flexible and, when relaxed, its centerline forms a circle. The flexible O-ring is not molded or preformed in any way to facilitate placement into the irregular path of the groove. The circumference of the O-ring may be slightly smaller than the irregular path of the groove, so that the O-ring will have to be stretched to fit in the entire length of the groove. It can be difficult to keep the stretched O-ring in the groove as the parts are assembled. If the O-ring shifts out of the groove during assembly, the seal will leak. Because the O-ring is not visible when the components are joined, the shift may not be apparent when the components are assembled. The improper seal can result in leakage between the components, contamination, and equipment failure.

SUMMARY OF THE INVENTION

An object of the invention is to provide a method and apparatus for sealing between two components that are stationary relative to each other during operation.

An improved seal seals between two stationary components, at least one of which includes a groove in a sealing surface. The improved seal typically includes a flat surface from which extends an elastomeric bead that mates with the groove in the sealing surface. Flat regions adjacent to the bead mate with flat portions of the components while the bead goes into the groove. The surface of the seal on the face opposite the bead is typically flat and mates with a flat sealing surface of the other component.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF EMBODIMENTS

Figure 1:
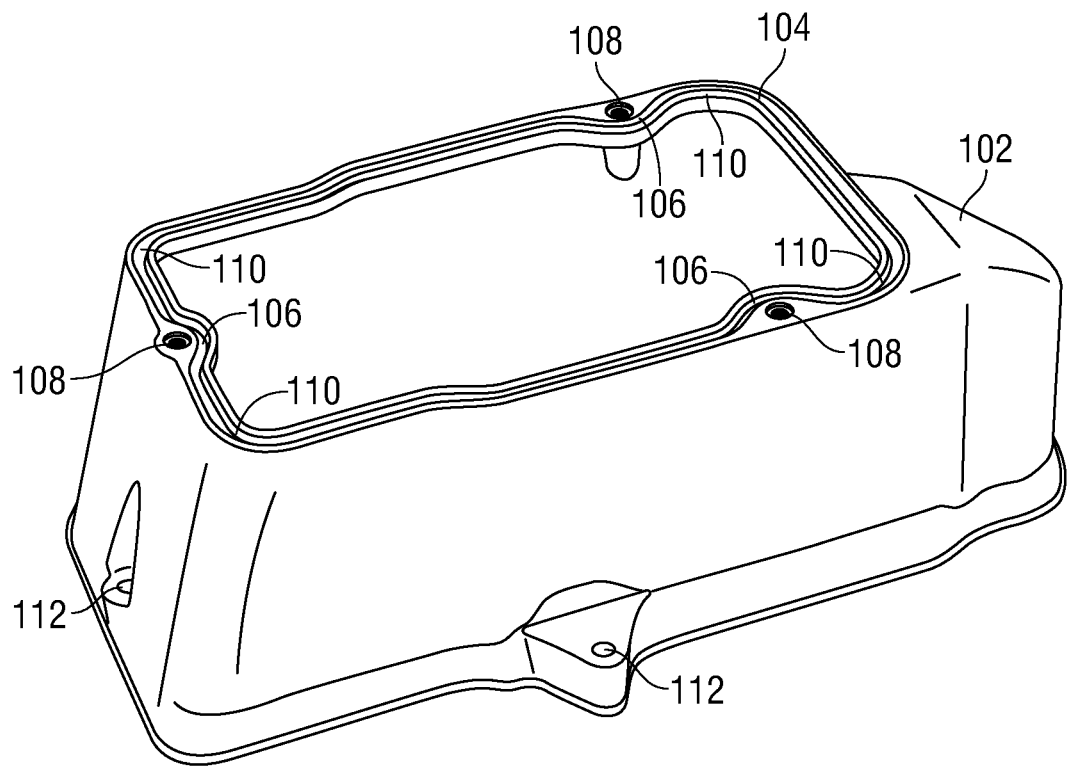
FIG. 1 shows a perspective view of a valve mechanism base for a Caterpillar 3600 Series engine.

An improved elastomeric seal designed to reduce improper installation and provide a more secure seal is described.

The improved seal provides a seal between two components, at least one of which includes a groove in a sealing surface. The seal is typically sandwiched between the two components and includes a top surface having an elastomeric bead that mates with a groove one of the two components. Flat surfaces on the sides of the bead mate with flat portions of the one of the two components while the bead goes into the groove. The seal includes a bottom surface that is typically flat and mates with a flat surface on the other component. The dimensions of the seal and cross-sectional shape of the bead on the seal are determined by the particular application, including the cross-sectional shape of the groove. The bead fits into the groove when the seal is placed on the component without the seal having to be substantially stretched or otherwise deformed, so the problem of an O-ring slipping out of the groove is eliminated. The seal optionally includes fastener holes through which fasteners can pass to hold the two components together.

The fastener holes in the seal are optionally reinforced with inserts, preferably made of metal, which maintain the integrity of the seal under the pressure of the fastener. The inserts are preferably completely encapsulated by the elastomeric material so they will not corrode. Applicant has found that including the reinforcing insert at the fastener hole prevents leakage caused when tightening the fastener by preventing distortion of the elastomeric seal material.

The seal can be used as a retrofit to replace an O-ring between two mechanical components or as part of an original assembly design. The seal is typically pre-formed for a specific application and the bead is custom designed to fit the groove of the particular mechanical component.

The bead height is preferably slightly greater than the depth of the groove so that the bead is compressed when the components are assembled. O-ring grooves are typically wider than they are high, and the bead is sufficiently narrow relative to the groove width so that the bead can expand horizontally in the groove as the bead is compressed vertically as the components are assembled. If the bead height is insufficient, the bead will not be sufficiently compressed to form a good seal in the groove. The seal must also form a seal between the flat side opposite the bead and the flat sealing surface of the non-grooved component. If the bead height is too great, the seal device will not properly seal on the flat side. So the bead height must be sufficiently large that the bead is compressed in the groove to form a seal, but not so large that the bead prevents the flat side opposite the groove from sealing. A skilled person can determine a bead height and shape for any application by starting with a best guess and observing if the device is leaking on the bead side or the flat side, and then changing the height of the bead until a design is achieved that does not leak in the specific application. Based on this guidance, a skilled person can determine a proper bead dimension for any application without undue experimentation.

The cross-section shape of the bead will depend on the shape of groove. The cross-section shape of the bead is not necessarily a hemisphere. For example, the radius of curvature may increase away from the top of the bead, continuously or discontinuously. The cross section may include a relatively uncurved region area or a transition region where the curvature changes sign as the bead approaches the flat portion of the seal. The exact shape of the bead will vary with the application and can be determined without undue experimentation by a skilled person by trial and error, using the information provided herein. The bead, being fixed relative to the flat portions of the seal, is maintained congruent with the groove, and so it is easy to align and place the seal into the groove.

The groove typically runs on the inside of the fastener holes. The thickness of the flat portion will vary with the application and may be, for some applications, between about 1 mm and about 5 mm thick. In some applications, the flat portion is about 2 mm thick. The bead height, that is, the distance that the bead extends above the flat surface, may be, typically for example, between about 2 mm and 10 mm. In some applications, the bead height is about 4.1 mm.

The seal is multi-level, providing multiple sealing regions. The seal creates a first seal between the bead and the groove and a second seal between the flat portions on the sides of the bead and a flat surface of the grooved component. Another seal is formed between flat surface on the face opposite the bead and the flat portion of the non-grooved component.

The metal fastener hole insert may be, for example, composed of cold-rolled, cold-annealed steel. If the metal insert is encapsulated, it does not need to be composed of a corrosion resistant material. The metal insert is preferably thinner than the flat portion so that the metal insert can be completely encapsulated by the elastomer material without creating a bulge. The thickness of the combined elastomer and metal insert should be the same as the thickness of the elastomer alone away from the hole. The metal insert should be sufficiently thin to provide sufficient elastomer above and below the metal insert to create a good seal at the fastener hole, while being sufficiently thick to prevent excessive extrusion of the elastomer that could create a leak when the components are tightened together by the fasteners.

The improved seal helps seal naturally aspirated engine components, as well as components of other types of engines and any mechanical devices.

Embodiment for Sealing Caterpillar 3600 Series Engine Valve Mechanism Base Cover Box As an example, a replacement seal, referred to as a "CG3600RCMR" seal, designed to seal between the valve mechanism base and the valve mechanism cover for the Caterpillar 3600 Series engine is described. The CG3600RCMR is a retrofit to replace the O-ring that comes installed as an OEM part. Attributes described for this embodiment may apply to other embodiments, although not all embodiments have the limitations of the embodiment described below.

Figure 2:
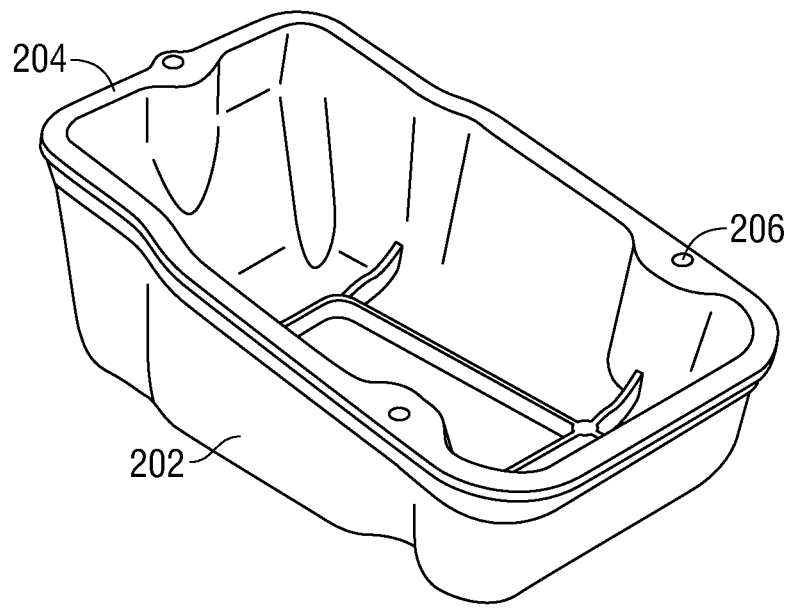
FIG. 2 shows an inverted perspective view of a valve mechanism cover for a Caterpillar 3600 Series engine.

Problems with the Prior Art OEM O-Ring Seal for Caterpillar 3600 Series Engine Valve Mechanism Base Cover Box FIG. 1 shows a valve mechanism base 102 for a Caterpillar 3600 Series engine. FIG. 2 shows the valve mechanism cover 202. A prior art O-ring (not shown) seals between a groove 104 in the valve mechanism base and a smooth, flat face surface 204 on the valve mechanism cover. Groove 104 is designed with several curved sections 106 that route the O-ring around bolt holes 108 and curved section 110 around the corners. Holes 112 accommodate bolts (not shown) that attach the valve mechanism base to the engine. The prior art O-ring is not molded or preformed in any way to enhance the ease of placement into the groove. Given the narrow cross-section of the groove and the O-ring seal itself, it is not uncommon for the O-ring to slip from the shallow groove during installation of the valve mechanism cover 202. If this happens, the seal is compromised. It is difficult or impossible to visually ascertain the O-ring position, even though the installation may appear to be sufficient.

It has been reported by maintenance personnel that the O-ring sold as a maintenance-related replacement part corresponding to the original equipment may crimp or slip from the sealing groove during installation of the seal. Because the seal is not visible after installation, the installer cannot determine whether or not the seal is correctly positioned. As a result, the seal may be, unknown to the installer, incorrectly positioned and fail to perform its intended function. Incorrect positioning could result in leakage from the engine component, which might result in equipment failure. Leakage from seal failure can result in a fire.

Detailed Description of the CG3600RCMR Seal

CG3600RCMR is a molded elastomeric seal designed to mate with an O-ring-type groove sealing surface in valve mechanism base. The CG3600RCMR surface on the face opposite the bead is flat and seals to the flat surface of the valve mechanism cover. The CG3600RCMR prevents fluid and gas from escaping from the valve box under operating conditions. The O-ring seal design capabilities of the original manufacturer's design are utilized by the bead portion of the CG3600RCMR for sealing purposes. By molding a flat face base with reinforced bolt holes, installation is made more reliable and simpler. The seal can be manufactured by injection molding or any traditional elastomeric molding technologies.

Figure 3A:
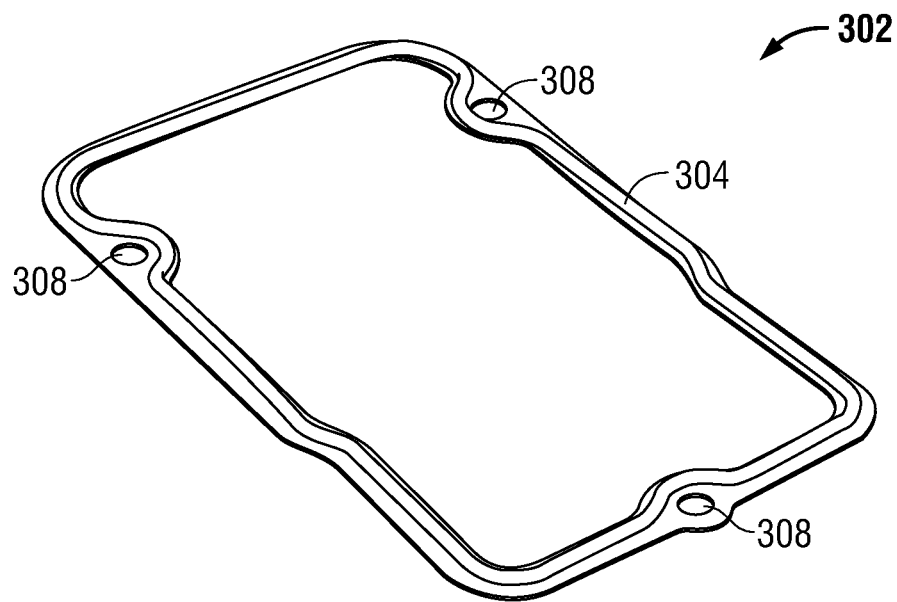
FIG. 3A shows a bottom perspective angle of CG3600RCMR seal and FIG. 3B shows a top perspective angle of CG3600RCMR seal.
Figure 3B:
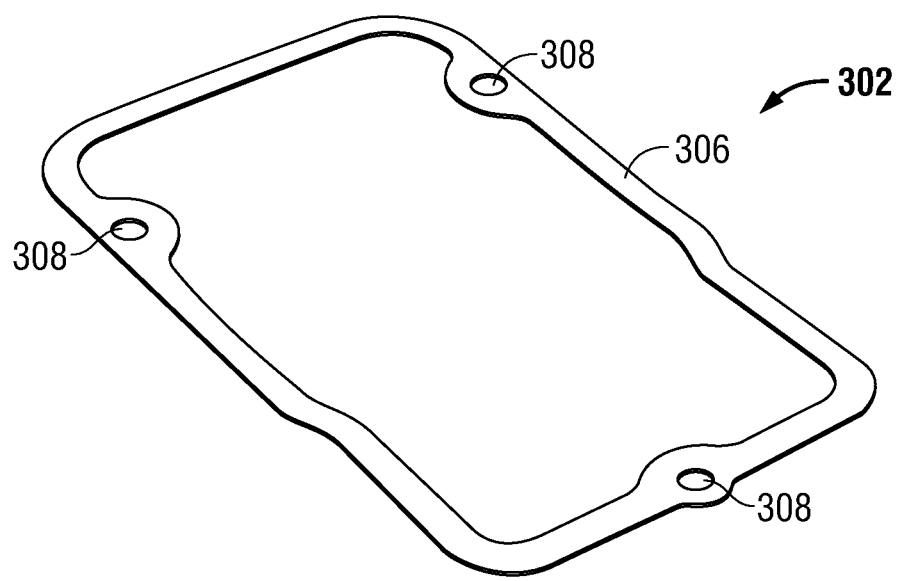

FIG. 3A and FIG. 3B show a CG3600RCMR seal 302, with FIG. 3A showing a top perspective view and FIG. 3B showing a bottom perspective view. The CG3600RCMR seal 302 enhances the ease and correct installation and maximizes the integrity of the seal between the valve mechanism base 102 and the valve mechanism cover 202. The CG3600RCMR seal 302 allows for a visual confirmation of the installation process to prevent misalignment of the seal, which could result in failure of the seal as to its intended purpose.

The CG3600RCMR seal 302 is a molded elastomeric seal with a sealing bead 304 and flat portions, molded as a single unit. The CG3600RCMR seal 302 is designed to fit directly onto flat sealing surfaces on the valve mechanism base 102 and the valve mechanism cover 202 and sealing bead 304 is designed to fit into the groove 104 on the valve mechanism base 102, all with no manipulation involved. The sealing bead 304 configuration matches the configuration of the groove 104. The sealing surfaces adjacent to the bead 304 are flat and covers essentially the entire external face of the valve mechanism base 102 when assembled. The sealing surface on the opposite side of the CG3600RCMR seal 302 from the bead 304 is flat and covers essentially the entire external face of the valve mechanism cover 202 when assembled. This allows bolt holes 308 to be molded in the CG3600RCMR seal 302, further providing for the correct installation with little or no manipulation of the seal 302.

Figure 4:
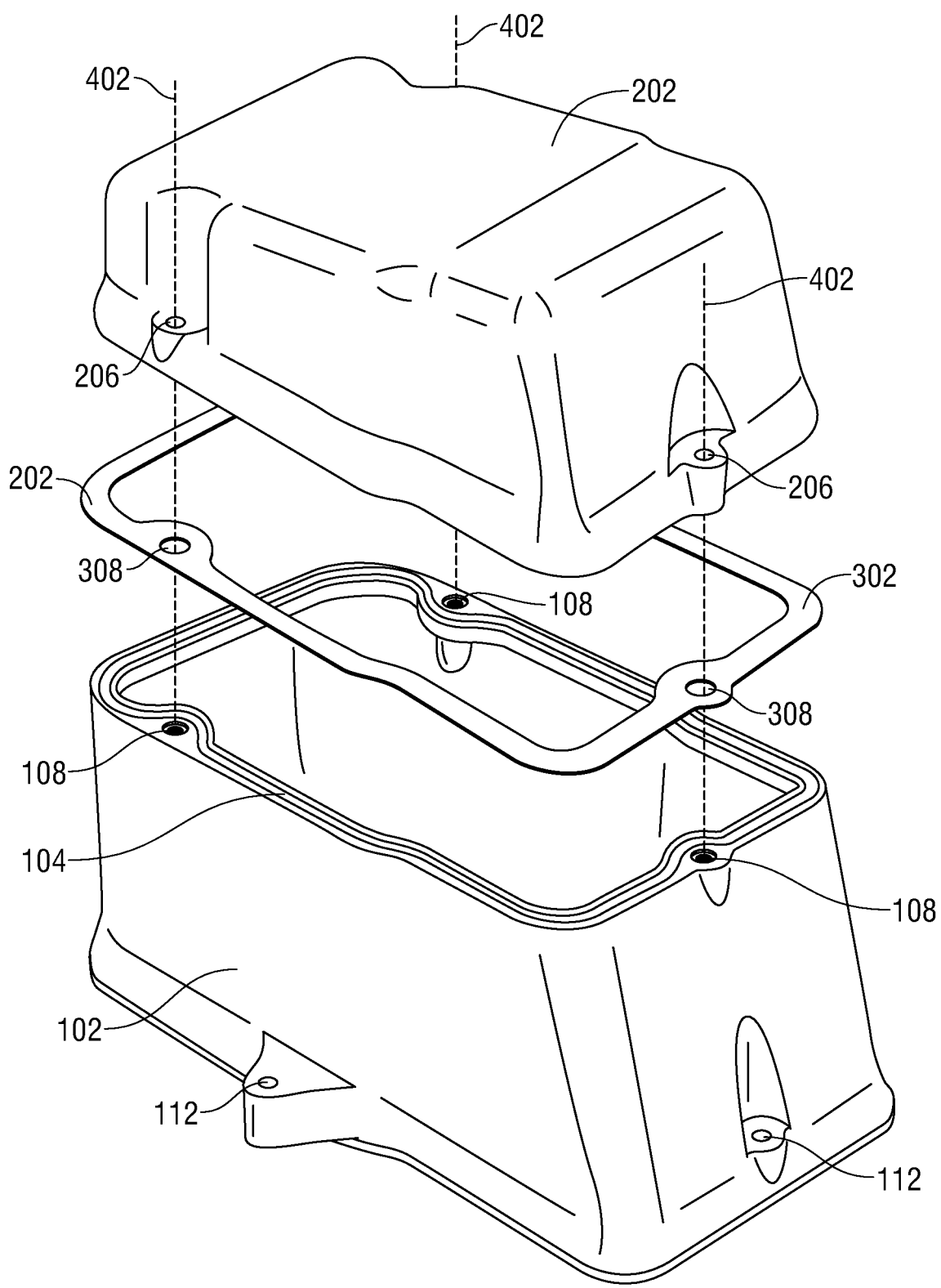
FIG. 4 is an exploded view of fitment showing proper placement of CG3600RCMR between valve mechanism base and the valve mechanism cover.

FIG. 4 is an exploded view that shows the valve mechanism base 102, valve mechanism cover 202, and CG3600RCMR seal 302, all aligned for assembly. Seal 302 is oriented with the bead 304 facing toward groove 104 in the valve mechanism base 102 and flat side 306 towards the valve mechanism cover 202. Lines 402 show the alignment of the bolts (not shown) through bolt holes 206 in valve mechanism cover 202, bolt holes 308 in seal 302, and bolt holes 108 is the valve mechanism base 102.

Figure 5:
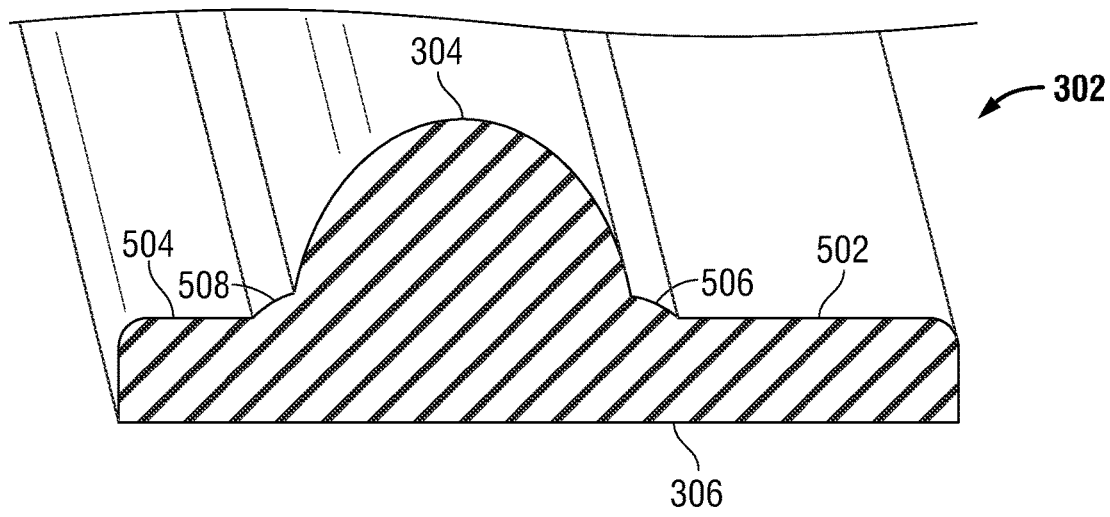
FIG. 5 show a cross section of the CG3600RCMR seal.

FIG. 5 shows a cross-sectional view of CG3600RCMR seal 302. As shown in FIG. 5, there is a relatively flat first flat area 502 on the outside of sealing bead 304 and another relatively flat second flat area 504 to the inside of sealing bead 304. A first transition region 506 connects bead seal 304 to first flat area 502 and a second transition region 508 connects bead seal 304 to second flat area 504. When the bead 304 seals in groove 104, flat areas 502 and 504 seal against the flat areas on either side of groove 104 of valve mechanism base 102. The outer edge of the seal conforms to the outer edge of the valve mechanism base and valve mechanism cover. Visual inspection allows the installer to verify that the seal is in place accurately.

Figure 6:
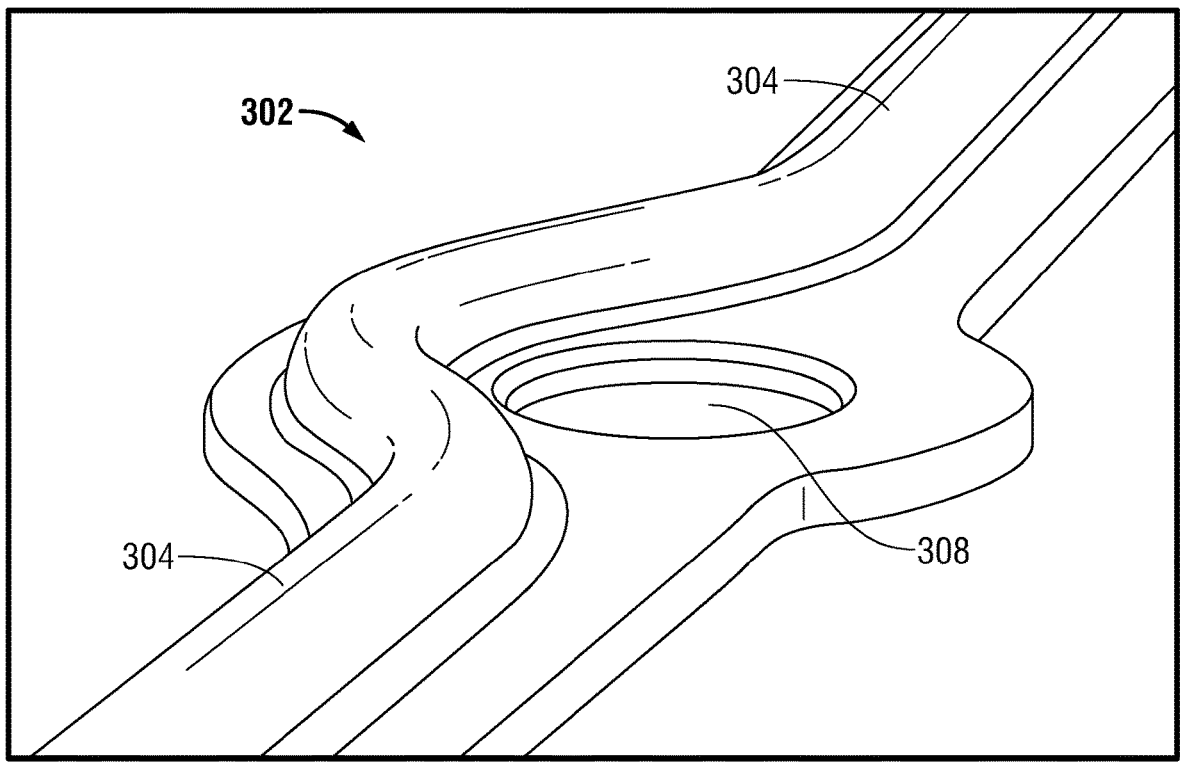
FIG. 6 show an enlarged view of a portion of the CG3600RCMR seal including a bolt hole.
Figure 7:
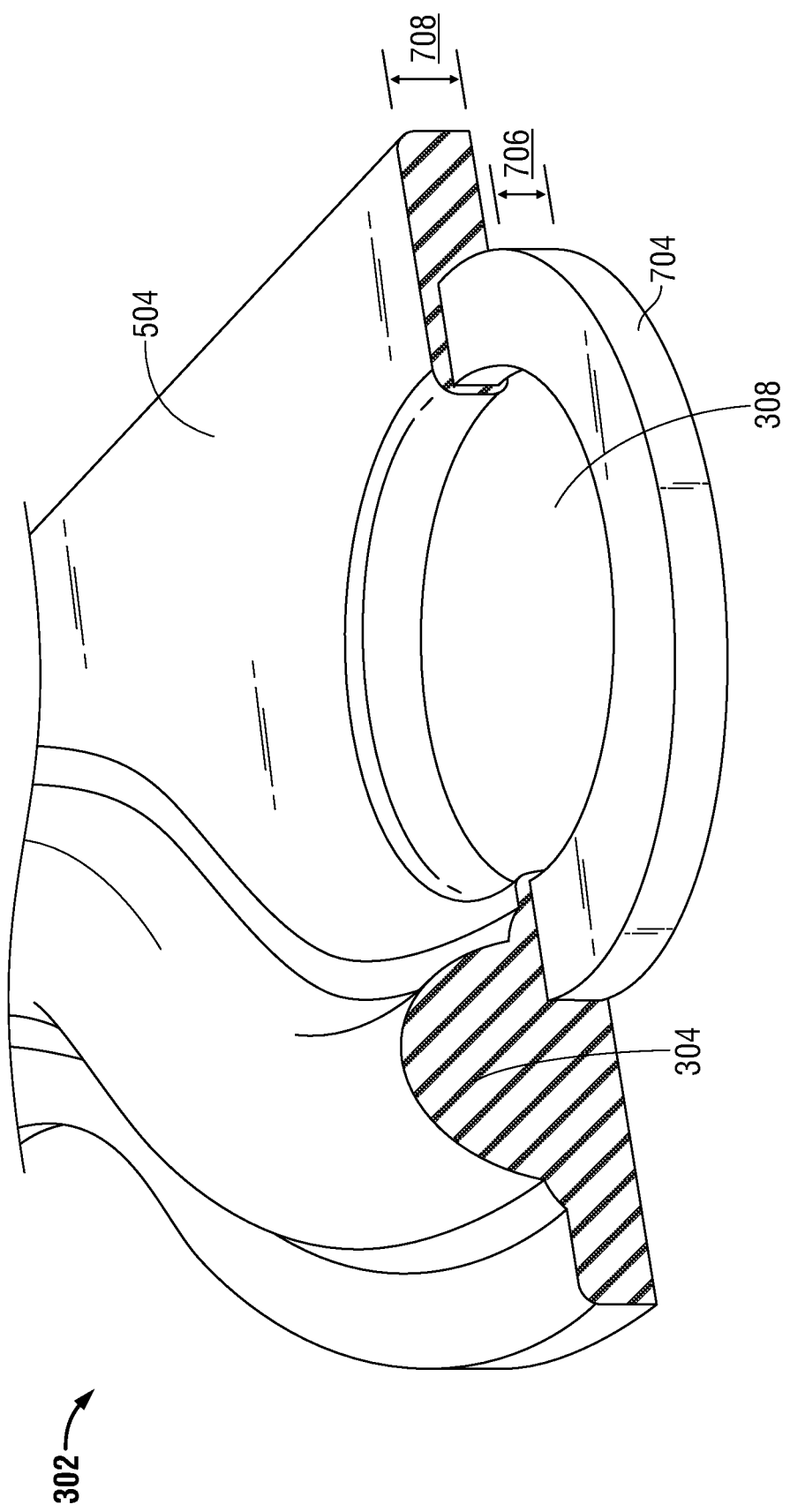
FIG. 7 shows a partial cross section of the CG3600RCMR seal of FIG. 1 showing the bolt hole and an exposed metal bolt hole insert.

FIG. 6 shows an enlarged portion of CG3600RCMR seal 302 including one of the bolt holes 308. Bead 104 curves around bolt hole 308. Bolt holes 308 are steel reinforced to prevent extrusion during the torquing process. FIG. 7 shows a portion of a seal 302 with some of the elastomer removed to show a fastener hole insert 704 around bolt hole 308. The metal fastener hole insert 704 may be, for example, composed of cold-rolled, cold-annealed steel. Metal inserts may comprise stamped parts that are readily available.

If the metal fastener hole insert 704 is encapsulated, it does not need to be composed of a corrosion resistant material. The thickness 706 of the metal fastener insert 704 is preferably less than the thickness 708 of flat portion 504 of seal 302 so that the metal fastener insert 704 can be completely encapsulated by the elastomer material on both sides without creating a bulge.

For example, the metal fastener insert may be about 0.813 mm thick while the flat elastomeric portion is about 2 mm thick. The metal insert thickness may be, for example, about one half the thickness of the elastomer. The thickness of the combined elastomer and metal fastener insert should be about the same as the thickness of the flat portion of the elastomer alone away from the hole. The metal fastener insert should be sufficiently thin to provide sufficient elastomer above and below the metal fastener insert to create a good seal at the fastener hole, while being sufficiently thick to prevent excessive extrusion of the elastomer that could create a leak when the components are tightened together by the fasteners.

This CG3600RCMR seal enhances installation and maintenance procedures for any mechanical technicians maintaining these engines, which are used in various industrial and heavy equipment applications worldwide. The use of the CG3600RCMR seal further ensures proper installation and markedly reduces the possibility of component leakage.

While the CG3600RCMR seal described above is specific to the Caterpillar 3600 Series engine valve mechanism base cover box, other embodiments can be designed for sealing between any two components that are stationary relative to each other. Seals can be designed to be retrofitted for various applications in which one of the two sealing components has a groove on the sealing surface. While the CG3600RCMR seal has a bead on one side, embodiments can be designed with beads on both sides for sealing parts that include grooves on both sides. The flat surface of the seal can extend from along both sides of the bead or along only one side of the bead. The size of the extension can be same or different on the opposite sides of the bead. The transition region between the bead and the flat portions can take different shapes, such as having a linear cross section or having a curved cross section, and the transition section can be different on the different sides of the bead. While the entire CG3600RCMR seal is composed of an elastomer, in some embodiments the bead portion can be composed of an elastomer while the flat portions are composed of an alternative gasket material. Following the example provided herein, a skilled person can design a seal for any new or retrofit application.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. An elastomeric sealing device for sealing between two components, a first one of the two components including a groove, comprising:
   a top surface;
   a bottom surface;
   a bead extending from the top surface and adapted in size and shape to mate with the interior of the groove in a manner whereby a seal is created that is resistant to the passage of gas or liquid;
   a transition region between the bead and the top surface, the transition region intersecting the bead above the top surface;
   multiple fastener holes extending through the sealing device; and a metal insert surrounding and reinforcing each of the multiple fastener holes.

2. The elastomeric sealing device of claim 1 in which the metal insert is embedded in elastomer so that no metal is exposed to the environment outside of the elastomeric sealing device.

3. The elastomeric sealing device of claim 1 in which the elastomeric sealing device is adapted in size and shape to provide a seal between a valve mechanism base and valve mechanism cover in a Caterpillar 3600 Series gas compression engine.

4. The elastomeric sealing device of claim 3 in which the bead height is greater than the depth of the groove in a valve mechanism base so that the bead is compressed when the valve mechanism cover is fastened to the valve mechanism case.

5. The elastomeric sealing device of claim 1 wherein the multiple fastener holes comprise two, three, or four fastener holes.

6. The elastomeric sealing device of claim 1 in which:
the elastomeric sealing device is custom configured to fit between two mating components of a specific machine, one of the two mating components including the groove, and
the height to which the bead extends above the top surface and is greater than the depth of the groove, such that the bead is compressed when the two mating components are assembled.

7. A method of retrofitting an O-ring seal between two components held together by fasteners, a first one of the two components including a groove for seating the O-ring between the two components, the method comprising:
removing the fasteners holding the two components together;
separating the two components;
removing the O-ring;
setting an elastomeric sealing device in accordance with claim 1 onto a first one of the two components such that the bead is positioned within the groove and the multiple fastener holes are aligned with fastener holes in the first one of the two components;
setting the second one of the two components onto the first one of the two components with fastener holes in the two components aligned with each other and with the multiple fastener holes of the elastomeric sealing device;
inserting and tightening fasteners to secure the two components with the elastomeric sealing device between the components, the elastomeric sealing device forming a seal between the two components.

8. The method of claim 7 in which the setting an elastomeric sealing device in accordance with claim 1 onto a first one of the two components such that the bead is positioned within the groove is performed without stretching the elastomeric sealing device to fit the bead in the groove.

9. The method of claim 7 in which the fastener holes in one of the two components are blind holes.

10. The method of claim 7 in which the fastener holes in one of the two components are threaded.

11. A sealing device comprising:
a first side including a flat surface for sealing with a flat surface on a first mechanical components; and
a second side including a bead for sealing with a groove in a second mechanical component, the second side further including a second flat surface, the second flat surface forming a seal with a flat surface on the second mechanical component; and
a transition region between the bead and the second flat surface, the transition region intersecting the bead above the flat surface.

12. The sealing device of claim 11 in which the second flat surface comprises portions on either side of the bead.

13. The elastomeric sealing device of claim 1, in which the only reinforcing material in the gasket is at the holes.

14. The elastomeric sealing device of claim 1, in which the transition region is slopes upward from the top surface to the bead and is flat or curved.

* * * * *

UNITED STATES PATENT AND TRADEMARK OFFICE
CERTIFICATE OF CORRECTION

PATENT NO. : 12,259,042 B2
APPLICATION NO. : 18/592265
DATED : March 25, 2025
INVENTOR(S) : Landon Plumlee, Clinton Plumlee and Rosemary Cohoon Page 1 of 1

It is certified that error appears in the above-identified patent and that said Letters Patent is hereby corrected as shown below:

On the Title Page

Item (73) "Centex Industrial Gaskey" in the Assignee field should read --Centex Industrial Gasket--.

Signed and Sealed this
Sixth Day of May, 2025

Coke Morgan Stewart
*Acting Director of the United States Patent and Trademark Office*